United States Patent
Hench et al.

(10) Patent No.: US 9,120,261 B2
(45) Date of Patent: Sep. 1, 2015

(54) SEAL MOLDING SLEEVE

(75) Inventors: Andrew Jeremiah Hench, Katy, TX (US); Ray Zonoz, Sugar Land, TX (US); Gregory Ulrich, Weimr, TX (US)

(73) Assignee: Cameron International Corporation, Houston, TX (US)

(*) Notice: Subject to any disclaimer, the term of this patent is extended or adjusted under 35 U.S.C. 154(b) by 491 days.

(21) Appl. No.: 13/372,236

(22) Filed: Feb. 13, 2012

(65) Prior Publication Data

US 2013/0207312 A1 Aug. 15, 2013

(51) Int. Cl.
| | |
|---|---|
| B29C 43/18 | (2006.01) |
| B29C 43/02 | (2006.01) |
| B29D 99/00 | (2010.01) |
| F16J 15/12 | (2006.01) |
| E21B 33/04 | (2006.01) |
| B29L 31/26 | (2006.01) |
| B29C 33/30 | (2006.01) |
| E21B 33/00 | (2006.01) |

(52) U.S. Cl.
CPC ............... B29C 43/18 (2013.01); B29C 43/027 (2013.01); B29D 99/0053 (2013.01); E21B 33/04 (2013.01); F16J 15/128 (2013.01); *B29C 33/306* (2013.01); *B29L 2031/265* (2013.01); *E21B 2033/005* (2013.01)

(58) Field of Classification Search
None
See application file for complete search history.

(56) References Cited

U.S. PATENT DOCUMENTS

| | | | |
|---|---|---|---|
| 2,689,755 A * | 9/1954 | Krotz | 403/221 |
| 3,193,884 A | 7/1965 | Haynie | |
| 3,241,193 A | 3/1966 | Kingsley | |
| 3,315,316 A | 4/1967 | Baney | |
| 3,405,214 A | 10/1968 | Butts | |
| 3,940,155 A | 2/1976 | Baumle | |
| 4,171,561 A | 10/1979 | Bainard | |
| 4,597,730 A * | 7/1986 | Rozmus | 425/78 |
| 4,915,892 A * | 4/1990 | Peppiatt | 264/138 |
| 4,984,976 A * | 1/1991 | Kozachevsky et al. | 425/35 |

(Continued)

FOREIGN PATENT DOCUMENTS

| | | |
|---|---|---|
| CN | 201627544 U | 11/2010 |
| CN | 201908606 U | 7/2011 |

(Continued)

OTHER PUBLICATIONS

PCT International Search Report for PCT Application No. PCT/US2012/066900 dated May 2, 2013.

(Continued)

*Primary Examiner* — Ryan Ochylski
(74) *Attorney, Agent, or Firm* — Fletcher Yoder P.C.

(57) ABSTRACT

Systems and methods for manufacturing seals (e.g., metal end cap (MEC) seals) having inner and/or outer surfaces that include grooves are provided. In particular, seal mold assemblies may include removable, flexible, non-metallic annular mold inserts (e.g., sleeves) that may be inserted into annular mold cavities of inner and outer annular mold rings. As such, the mold inserts may be used interchangeably and modularly to create many different types of grooved seals, without the need to use different inner and outer annular mold rings. Using mold inserts in this manner eliminates the need for secondary machining processes on the inner and/or outer surfaces of the grooved seals, thereby reducing overall manufacturing costs and time as well as providing greater consistency and repeatability between manufactured grooved seals.

19 Claims, 10 Drawing Sheets

(56) References Cited

U.S. PATENT DOCUMENTS

| | | | |
|---|---|---|---|
| RE33,603 E * | 6/1991 | Christiansen | 425/117 |
| 5,180,008 A | 1/1993 | Aldridge et al. | |
| 5,326,244 A | 7/1994 | Ridgill | |
| 5,791,657 A | 8/1998 | Cain et al. | |
| 5,873,576 A | 2/1999 | Dietle et al. | |
| 6,620,361 B1 * | 9/2003 | Longtin et al. | 264/138 |
| 6,908,587 B1 * | 6/2005 | Balter et al. | 264/501 |
| 2002/0121743 A1 | 9/2002 | Crow et al. | |
| 2004/0224130 A1 * | 11/2004 | Melucci et al. | 428/156 |
| 2005/0035556 A1 * | 2/2005 | Lang et al. | 277/589 |
| 2006/0001193 A1 * | 1/2006 | Booth | 264/319 |
| 2009/0041882 A1 * | 2/2009 | Sabourin | 425/387.1 |
| 2011/0266752 A1 | 11/2011 | Kocurek et al. | |

FOREIGN PATENT DOCUMENTS

| | | | |
|---|---|---|---|
| FR | 2 704 042 A1 | 10/1994 | |
| GB | 1 224 219 A | 3/1971 | |
| GB | 1239521 A | 7/1971 | |
| WO | WO 8001598 A1 * | 8/1980 | F16J 15/32 |

OTHER PUBLICATIONS

Bauer, et al: "Dichtungen für die Fluidtechnik" Jan. 1, 1993, Dichtungen fuer die Fluidtechnik, Mainz : Vereinigte Fachverl, pp. 154-162, XP002507429, ISBN: 9783783002768, figures 1.7.22b, 1.7.22f,g.

PCT/US2010/020679; The International Search Report and the Written Opinion dated Apr. 22, 2010.

* cited by examiner

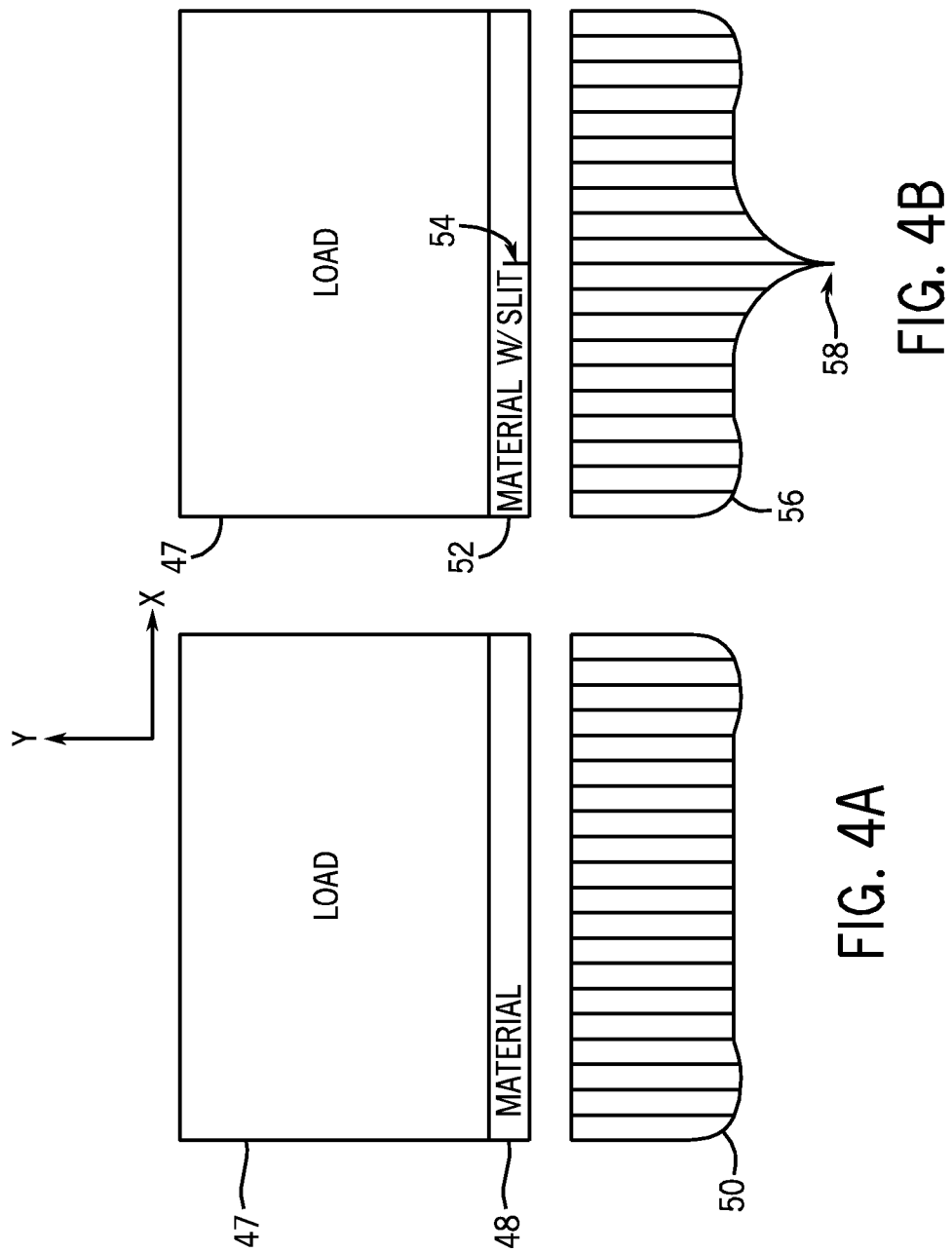

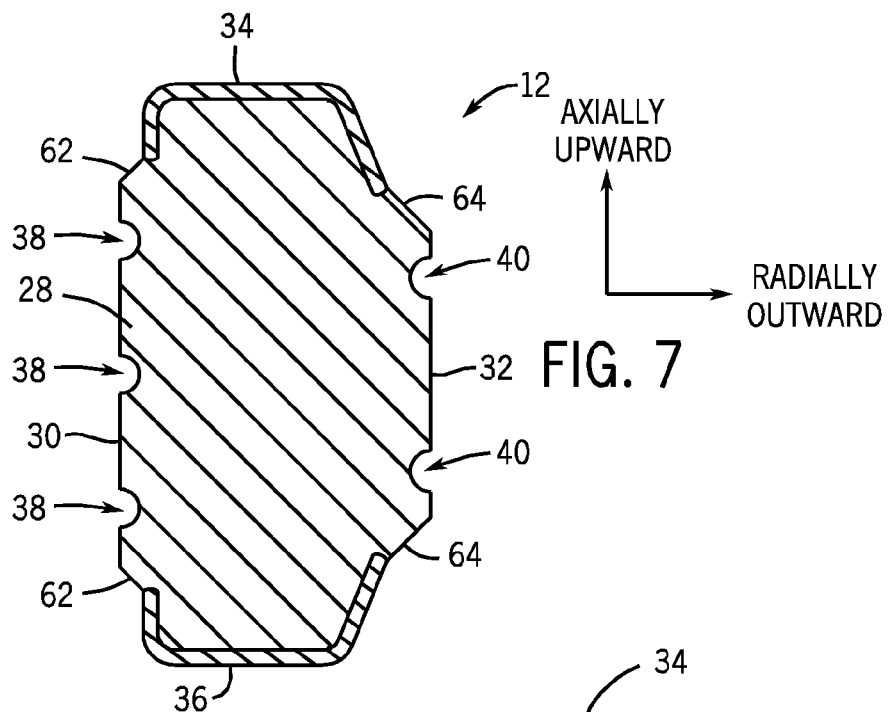
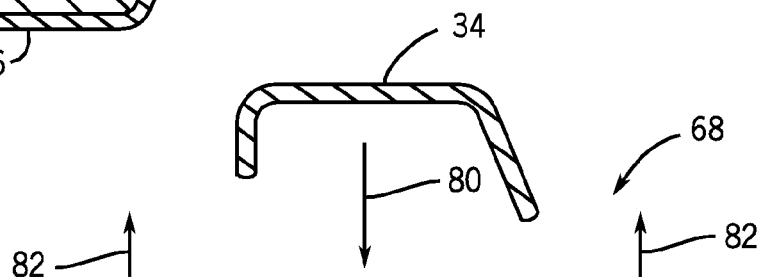
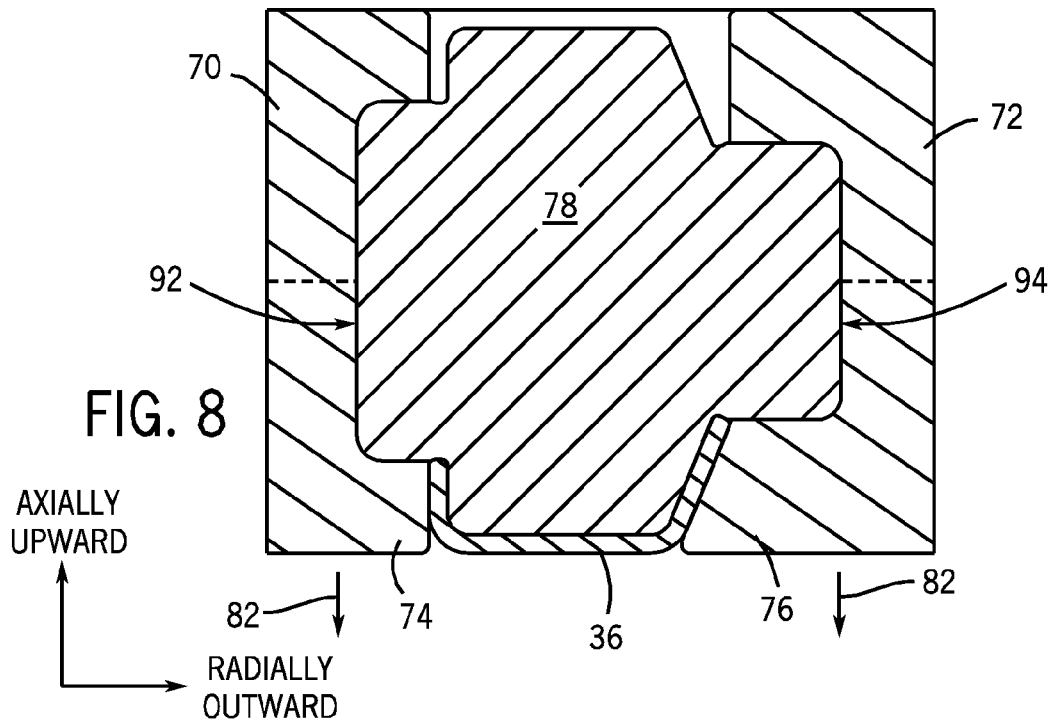

SEAL MOLDING SLEEVE

FIELD OF THE INVENTION

The present invention relates to seals within a fluid system. More specifically, the present invention relates to manufacturing methods for creating grooved seals suitable for use in the harsh environments encountered by mineral extraction systems, for example.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fluid systems, such as mineral (e.g., oil and gas) extraction systems and transport systems, typically include multiple segments of tubing, valves, and connectors that are sealed together by various seals. These seals are often subjected to harsh environmental conditions, such as exposure to corrosive fluids, extreme pressures, and extreme temperatures. Moreover, seals are often disposed in remote equipment, such as a marine (e.g., sub-sea) wellhead, which can make access and repair of the seals difficult and expensive. In mineral extraction applications, seals are often constructed of elastomers or rubbers. These seals frequently experience large temperature variances. Over time, due primarily to this temperature gradient, these seals are damaged in that they tend to lose their memory or shape. When this type of damage occurs, the seals are less effective at high pressures and sub-ambient temperatures.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIGS. 4A and 4B illustrate the loads and contact stress concentrations that may be exerted on exemplary embodiments of the grooved seal;

FIG. 7 is a partial cross-section of an exemplary embodiment of a MEC seal with multiple inner grooves on its inner face and multiple outer grooves on its outer face;

FIG. 8 is a partial cross-section illustrating an exemplary embodiment of a mold assembly used during manufacturing of the MEC seal of FIG. 6;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

As described in detail below, the disclosed embodiments include systems and methods for manufacturing seals (e.g., metal end cap (MEC) seals) having inner and/or outer surfaces that include grooves that more effectively distribute contact stresses across the inner and/or outer surfaces. In particular, the disclosed embodiments include seal mold assemblies for creating grooved seals, with the seal mold assemblies including removable, flexible, non-metallic annular mold inserts (e.g., sleeves) that may be inserted into annular mold cavities of inner and outer annular mold rings. As such, the mold inserts may be used interchangeably to create grooved seals having various combinations of inner and/or outer surfaces having grooves, without the need to use different inner and outer annular mold rings. In other words, the inner and outer annular mold rings may remain the same for the mold assembly, whereas the mold inserts may be reused interchangeably and modularly to create many different types of grooved seals. Using the mold inserts in this manner eliminates the need for secondary machining processes on the inner and/or outer surfaces of the grooved seals, thereby reducing overall manufacturing costs and time as well as providing greater consistency and repeatability between manufactured grooved seals.

Figure 1:
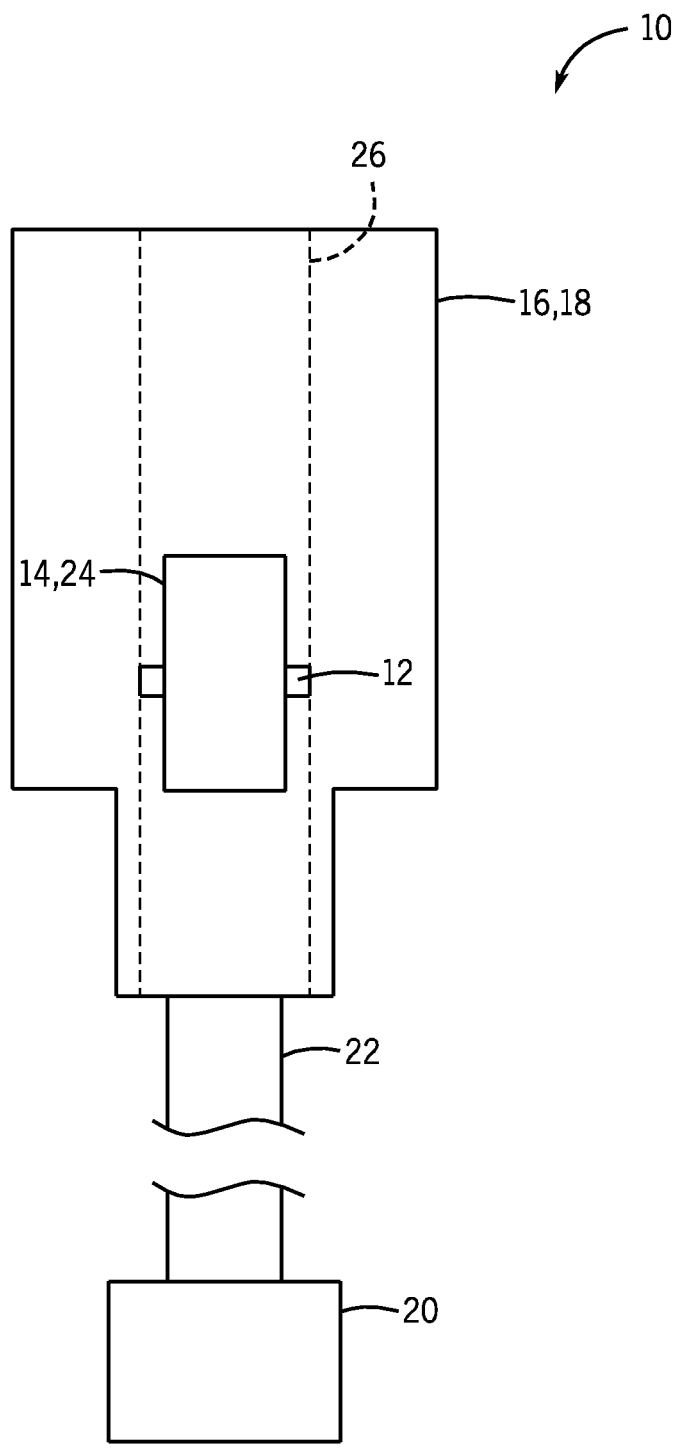
FIG. 1 is a block diagram of a grooved seal disposed in a fluid system, in accordance with embodiments of the present technique.

Turning now to the figures, FIG. 1 is a partial cross-sectional view of an embodiment of a fluid system 10 having one or more grooved seals 12 between an inner body 14 and an outer body 16. As described in greater detail below, the grooved seal 12 may be a metal end cap (MEC) seal, or any other suitable seal, having one or more grooves on inner and/or outer faces, which contact the inner and outer bodies 14, 16. In certain embodiments, the fluid system 10 includes a mineral extraction system for the extraction of subterranean natural resources, such as oil and gas. For example, in the illustrated embodiment, the outer body 16 includes a wellhead 18 coupled to a mineral deposit 20 via a well 22. The inner body 14 includes a hanger 24 disposed in a wellhead bore 26 and supported by the wellhead 18, for example. In the case of mineral extraction systems, the inner body 14 and the outer body 16 may include or be coupled to any number of components, such as christmas trees, casing hangers, casing heads, casing strings, tubing hangers, tubing heads, tubing strings, running tools, blowout preventers, valves, flanges, and so forth. In mineral extraction and similar systems, the grooved seal 12 may be used with working pressures up to 20,000 pounds per square inch (psi). In certain embodiments, the grooved seal 12 may be used to isolate regions of gases or fluids with pressure differentials across the seal 12 of 15,000 psi or greater. Further, the operating environment of such systems may include temperatures ranging from −50° F. to 350° F. or even greater.

Certain exemplary grooved seal embodiments described herein address one or more of the above-mentioned challenges of operating a seal 12 in harsh sub-sea environmental conditions, such as exposure to corrosive fluids, extreme pressures, and extreme temperatures. As explained in greater detail below, the disclosed embodiments include a grooved seal 12 having a cross-section which includes grooves on inner and/or outer annular faces of the seal, which contact the inner or outer bodies 14, 16 to form fluid seals. The grooves may function to create higher contact stresses near the grooves, and may force the material used for the body of the seal 12 to slightly deform into a cavity formed by the groove, thereby more effectively sealing between the inner and outer bodies 14, 16 and the grooved seal 12.

In addition, the grooved seal 12 embodiments described herein may be capable of operation across a broader spectrum of temperatures and pressures. As described above, the environments within which sub-sea seals operate are frequently transitioned between hot and cold temperature cycles. Tests have shown that typical sub-sea seals are generally only capable of maintaining 12,500 psi while cycling between approximately 35° F. and approximately 285° F. However, tests have shown that the grooved seals 12 described herein may be capable of maintaining 15,000 psi while cycling between approximately 20° F. and approximately 375° F. Therefore, the grooved seal 12 embodiments described herein may maintain greater pressure than typical seals across a wider range of temperatures than typical seals. In addition, it is estimated that the grooved seal embodiments described herein may be capable of maintaining 10,000 psi while cycling between approximately 10° F. and approximately 400° F. and maintaining 20,000 psi while cycling between approximately 35° F. and approximately 350° F.

Figure 2:
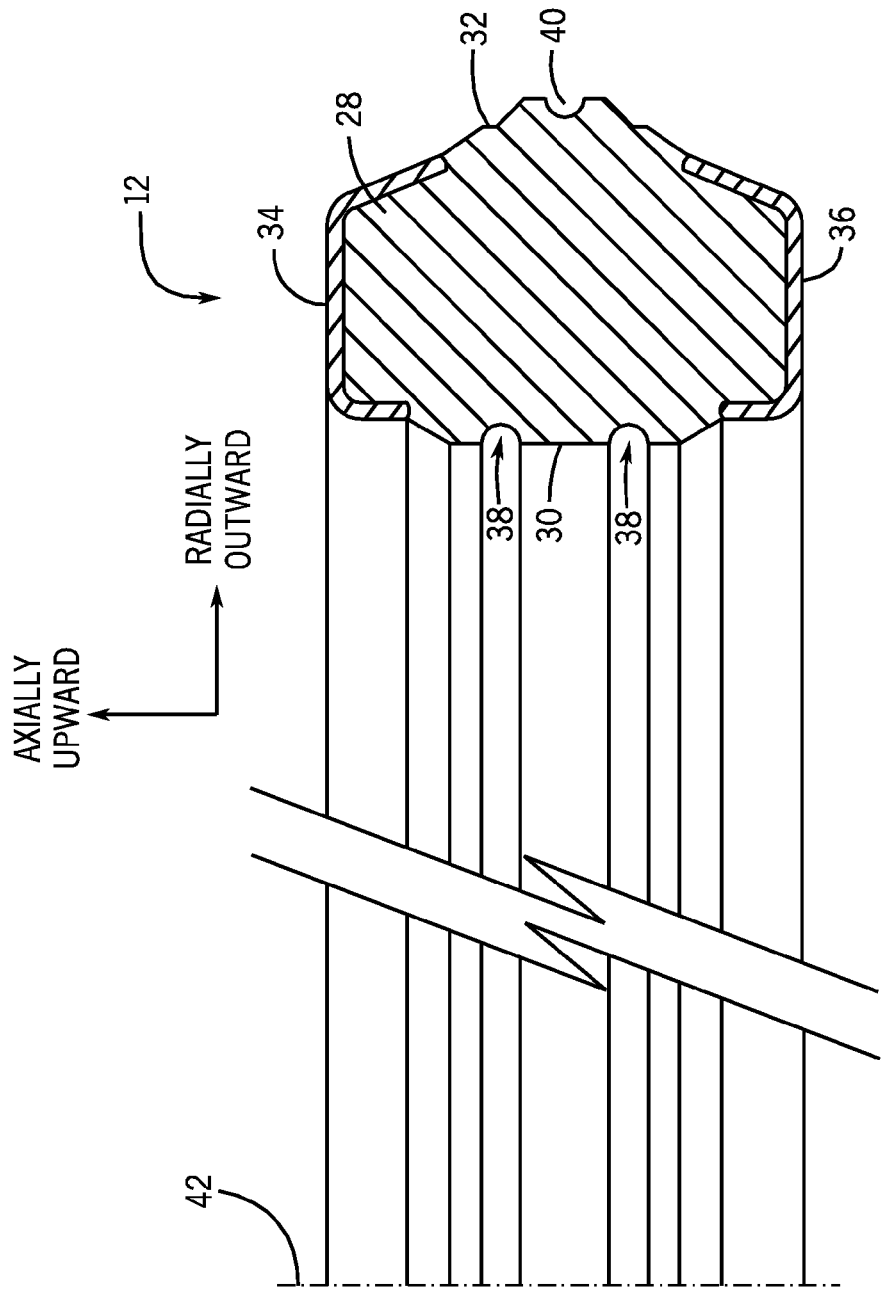
FIG. 2 is a partial cross-section of an exemplary embodiment of the grooved seal.

FIG. 2 illustrates a cross-sectional view of an exemplary embodiment of the grooved seal 12. The illustrated embodiment includes the annular grooved seal 12 having a body 28, an inner face 30, an outer face 32, a top metal end cap 34, a bottom metal end cap 36, one or more inner grooves 38 on the inner face 30, one or more outer grooves 40 on the outer face 32, and a longitudinal axis 42. The body 28 of the annular grooved seal 12 includes a ring-like member centered about the longitudinal axis 42. The inner face 30 includes the face of the grooved seal 12 on the innermost diameter of the body 28, which generally interfaces with (e.g., contacts) the inner body 14. The outer face 32 includes the face of the grooved seal 12 on the outermost diameter of the body 28, which generally interfaces with (e.g., contacts) the outer body 16. Accordingly, the inner face 30 and the outer face 32 may provide a fluid seal between the annular grooved seal 12 and the inner body 14 and the outer body 16, respectively. Although illustrated in FIG. 2 and frequently described herein as being an MEC seal, it will be understood that in certain embodiments, the grooved seal 12 may be a seal other than an MEC seal having metal end caps. Indeed, the techniques described herein may be used for the manufacture of any suitable annular seal having grooves on inner and/or outer faces, which distribute contact stresses via the grooves.

In an annular seal configuration, the grooved seal 12 is generally set by a radial load, which compresses or expands the seal into contact with complementary sealing surfaces (e.g., the inner body 14 and the outer body 16). For example, the inner body 14 may include a section with a smaller diameter, a section with a larger diameter, and a tapered section between the two sections. As such, the inner body 14 may urge the grooved seal 12 onto the inner body 14 and over the tapered section from the small diameter section to the large diameter section. This may provide an axial load, which biases the grooved seal 12 outward and compresses the grooved seal 12 against the outer body 16. Similarly, a taper on the outer body 16 may provide a compressive load on a grooved seal 12 to generate an inward radial loading, which compresses the grooved seal 12 against the inner body 14.

In general, the top metal end cap 34 and the bottom metal end cap 36 generally do not seal with a complementary surface. However, in a packer arrangement, the top metal end cap 34 and the bottom metal end cap 36 may generally be used as locations to apply loads to seat, set, and/or lock the grooved seal 12 in place. In other words, the top metal end cap 34 and the bottom metal end cap 36 may experience axial loads to push the grooved seal 12 into position, to compress the grooved seal 12 such that it expands radially between the inner body 14 and the outer body 16, and to hold the grooved seal 12 in place. For example, a tool may be forced against the top metal end cap 34 until the bottom metal end cap 36 contacts a surface and/or another tool. Therefore, the top metal end cap 34 may be loaded in a direction parallel to the longitudinal axis 42 to compress the grooved seal 12, causing the grooved seal 12 to expand radially. The radial expansion may cause the inner face 30 and the outer face 32 to bias against the inner body 14 and the outer body 16, respectively, forming a fluidic seal between the respective interfaces. Continuing to apply the axial force (e.g., locking the grooved seal 12) may maintain the radial expansion and, thus, maintain the fluid seal.

Figure 3A:
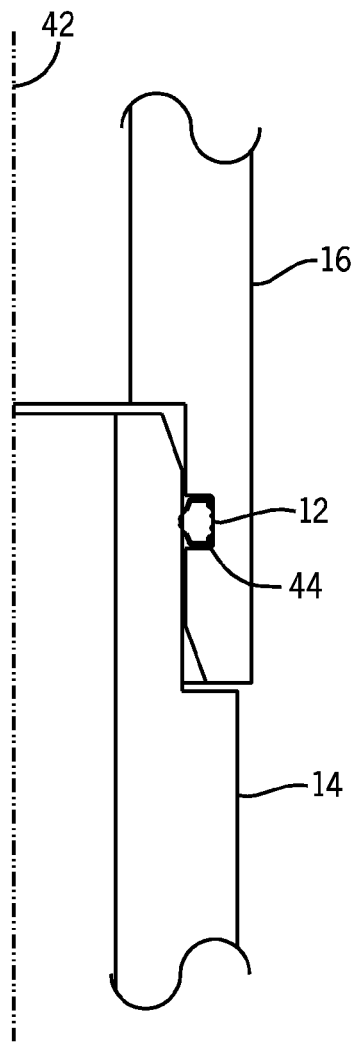
FIGS. 3A and 3B are cross-sectional views of exemplary embodiments of an inner body and an outer body, within which the grooved seal may be oriented.
Figure 3B:
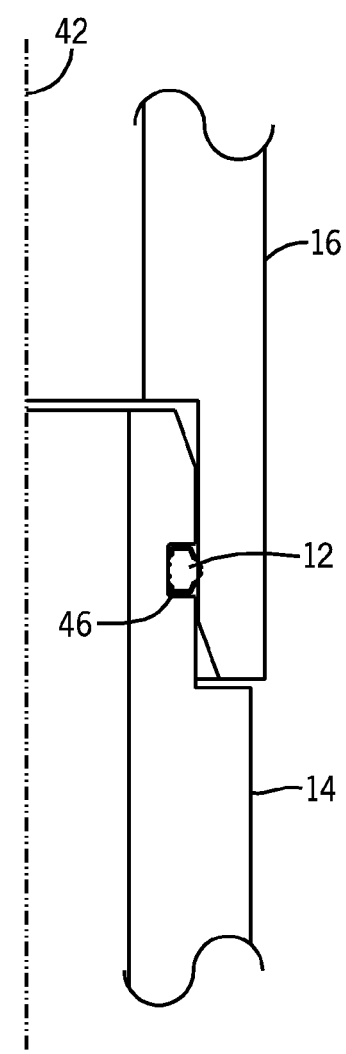

The body 28 of the grooved seal 12 may be oriented in various configurations between the inner body 14 and the outer body 16. For example, FIGS. 3A and 3B are cross-sectional views of exemplary embodiments of an inner body 14 and an outer body 16, within which the grooved seal 12 may be oriented. For instance, in FIG. 3A, the grooved seal 12 is located within an outer body recess 44 of the outer body 16. Conversely, in FIG. 3B, the grooved seal 12 is located within an inner body recess 46 of the inner body 14. Therefore, the grooved seal 12 may be located within recesses of either the inner body 14 or the outer body 16 and may be oriented in various ways within these recesses. In other words, the location and orientation of the grooved seal 12 may vary.

Returning now to FIG. 2, the portion of the grooved seal 12 (e.g., the seal interface) that engages the complementary surfaces (e.g., the inner body 14 and the outer body 16) may include a variety of shapes and configurations. For example, the seal interface may include a continuous surface that is formed from one or more materials. In an embodiment wherein the complementary sealing surface generally conforms to the contour of the grooved seal 12 (e.g., a relatively flat surface), the sealing interface may include a single engagement portion that extends across a surface of the grooved seal 12. In an embodiment where the complementary surface includes a surface that does not conform to a surface of the grooved seal 12 (e.g., an interrupted surface), the seal interface may include one or more engagement portions at each location where the grooved seal 12 contacts the complementary surface. Further, the grooved seal 12 may include a plurality of interruptions along its sealing surface. For example, the grooved seal 12 may include one or more bumps, protrusions, indentations, recesses, or similar features. Accordingly, where the complementary surface does not conform to the contour of the grooved seal 12, the seal interface may include one or more engagement portions at each of the locations where the grooved seal 12 contacts the complementary surface. Further, each of the seal engagement portions may include the same or even different types of materials, depending on the composition and arrangement of the materials used to form the grooved seal 12.

The body 28 of the grooved seal 12 may be characterized as hard and/or soft by a variety of metrics. In one embodiment, the hardness of the body 28 may be characterized by the resistance to indentation, otherwise referred to as the materials Durometer (D) denoted in the Shore A scale. In another embodiment, the body 28 may be characterized as hard or soft based on its stiffness (e.g., glass transitions temperature). In a characterization including the Durometer, materials are generally characterized based on ranges. Hard elastomers generally include those having a Durometer greater than about 80 Shore A, soft elastomers generally include those having a Durometer of about 60 Shore A to about 80 Shore A, and super-soft elastomers generally include those having a Durometer below about 60 Shore A.

In certain embodiments, the body 28 of the grooved seal 12 includes a hydrogenated nitrile butadiene rubber (HNBR) having a Durometer of about 90 Shore A. In other embodiments, the body 28 includes a nitrile rubber (NBR) having a Durometer of about 70 Shore A. Further, certain embodiments may include the body 28 formed from a CAMLAST™ or a DUROCAM™ material, manufactured by Cameron with headquarters in Houston, Tex. In addition, certain embodiments may include the body 28 formed from an Elast-O-Lion® material (e.g., Elast-O-Lion® 101 or Elast-O-Lion® 985), manufactured by the James Walker Group with headquarters in Cheshire, United Kingdom. In general, any other elastomer or rubber (e.g., Viton, EPDM, and so forth) suitable for use in sub-sea seal applications may be used for the body 28 of the grooved seal 12. In particular, rubbers and elastomers having a Durometer between 70 Shore A and 90 Shore A may be particularly well-suited. However, rubbers and elastomers having a Durometer between 60 Shore A and 100 Shore A may also be used.

In order to more fully discuss the grooved seal 12 embodiments described herein, the mechanics underlying the grooved seal 12 embodiments will now be presented. In particular, FIGS. 4A and 4B illustrate the loads and contact stress concentrations that may be exerted on exemplary embodiments of the grooved seal 12. Specifically, FIG. 4A illustrates how a load 47 may be applied to a first sheet of material 48, such as rubber. For illustration purposes, the load 47 is depicted as a uniform load 47 applied to a uniform sheet of material 48. However, the mechanics presented herein may also generally apply to less uniform configurations. The load 47 is analogous to the type of load which may be exerted on, for instance, the inner face 30 of the grooved seal 12 from the inner body 14 of FIGS. 2, 3A, and 3B. However, the load 47 may also be analogous to the type of load which may be exerted on, for instance, the outer face 32 of the grooved seal 12 from the outer body 16 of FIGS. 2, 3A, and 3B. In the scenario where the load 47 is uniformly distributed across a uniformly-distributed sheet of material 48 (i.e., without grooves or protrusions), the contact stress concentration 50 across the first sheet of material 48 may also be relatively uniform. Indeed, the contact stress may be approximately equal to:

$$\sigma_{uniform} = \frac{F}{A}$$

where $\sigma_{uniform}$ is the contact stress, F is the force applied by the load 47, and A is the cross-sectional area of the first sheet of material 48, upon which the load 47 is applied.

Conversely, FIG. 4B illustrates the same load 47 applied to a second sheet of material 52. As with the first sheet of material 48, the second sheet of material 52 is also uniformly distributed. However, the second sheet of material 52 includes a slit 54 having an infinitesimal width. In this scenario, as illustrated, the contact stress concentration 56 across the second sheet of material 52 will not be uniform, despite the relatively uniform load 47 and uniform cross-section of the second sheet of material 52. Rather, the contact stress concentration 56 across the second sheet of material 52 will be greater at contact stress point 58, corresponding to the location of the slit 54 along the bottom face of the second sheet of material 52. Indeed, the contact stress at point 58 will be greater than $\sigma_{uniform}$, corresponding to the uniform contact stress concentration illustrated in FIG. 4A. However, it should be noted that the integral area of both of the contact stress concentration 50, 56 profiles will be the same for both sheets of material 48, 52.

In particular, the contact stress in the y-direction is greater at the slit 54 due, at least in part, to the fact that the second sheet of material 52 is not supported in the x-direction and the z-direction (e.g., into and out of the page) at the slit 54. In other words, the material that was resisting movement in both the x-direction and the z-direction in FIG. 4A is allowed to move, even if very slightly, in the x-direction and the z-direction in FIG. 4B. In addition, in the context of the grooved seal 12 embodiments, the material of the body 28 of the grooved seal 12 may slightly deform into the cavity formed by the grooves, further creating a tighter seal. These mechanics may prove beneficial in that higher contact stresses at points corresponding to the grooves may enable the grooved seal 12 to create tighter seals and to maintain the shape memory of the grooved seal 12 over a greater range of operating temperatures and pressures.

However, the contact stress at the slit 54 would approach an infinitely large value if the slit 54 had an infinitesimal width. Infinitely large stresses at individual points may counteract the beneficial mechanics described above. Therefore, as a practical matter, the slit 54 illustrated in FIG. 4B may be replaced by grooves having more pronounced cross-sectional areas, as described in greater detail below. Using grooves may considerably reduce the stresses as compared to those experienced by the slit of FIG. 4B while still allowing for the benefits described above. In addition, the use of grooves may prevent crack propagation, which would be more likely when using slits.

Therefore, embodiments of the grooved seal 12 include cross-sections having one or more grooves. In certain embodiments, the grooves may be located along the inner face 30 and/or the outer face 32 of the body 28 of the grooved seal 12. The grooves effectively create ridges that provide areas of increased contact stress to maintain a fluid seal between the grooved seal 12 and the inner and outer bodies 14, 16. In particular, the point at which the grooves adjoin its respective face of the body 28 of the grooved seal 12 may experience increased contact stress. In addition, the overall contact area may be reduced between, for instance, the inner face 30 of the body 28 of the grooved seal 12 and the inner body 14, further increasing the contact stress. It should be noted that the grooves do not mate with any other mechanical features of the inner and outer bodies 14, 16, such as mating protrusions. Rather, a cavity is formed between each groove and the inner or outer body 14, 16 adjacent to the respective groove. Indeed, the material of the body 28 of the grooved seal 12 may slightly deform into the cavity formed by the grooves.

Figure 5:
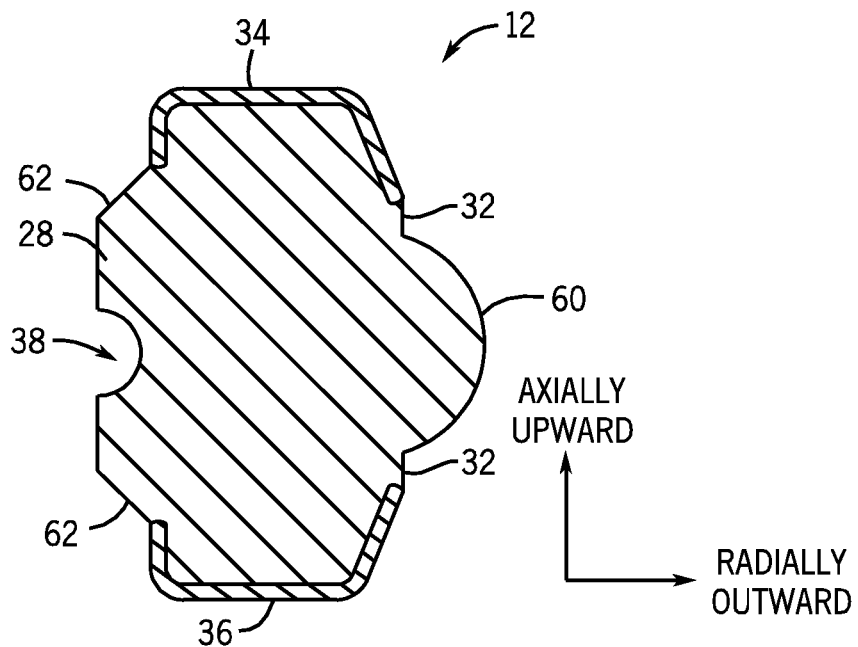
FIG. 5 is a partial cross-section of an exemplary embodiment of an MEC seal with an inner groove on its inner face.
Figure 6:
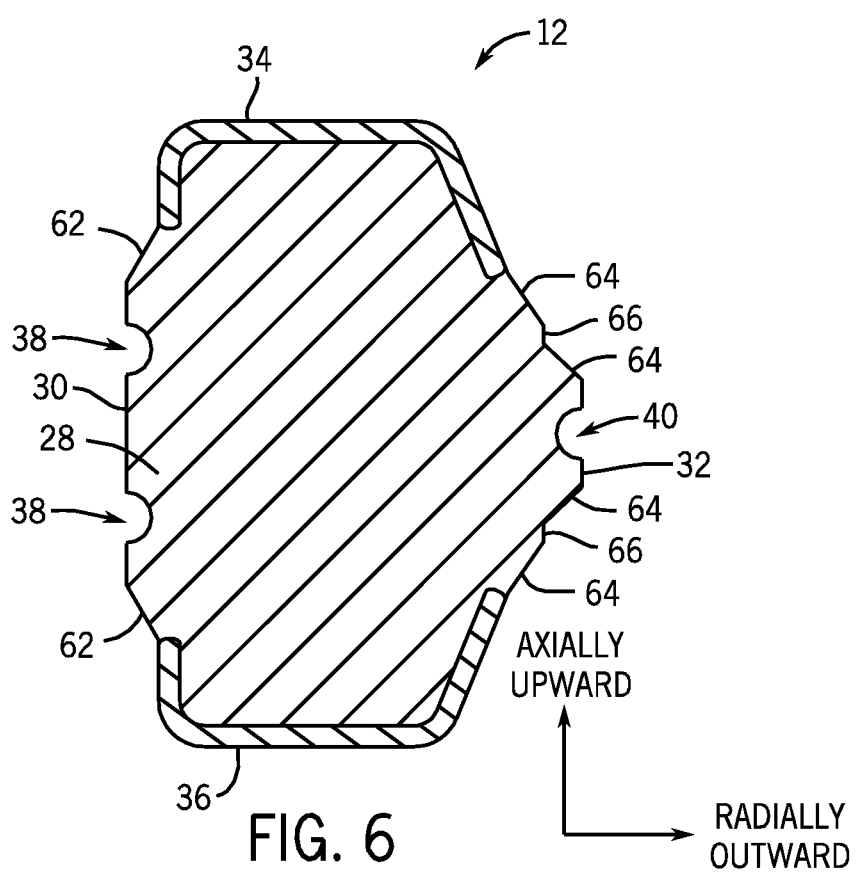
FIG. 6 is a partial cross-section of an exemplary embodiment of a MEC seal with multiple inner grooves on its inner face and an outer groove on its outer face.

Turning now to FIGS. 5-7, various embodiments of the grooved seal 12 are illustrated as a metal end cap (MEC) seal. However, other embodiments of the grooved seal 12 may include other configurations and geometries, such as S-seals. As such, although often described below as being MEC seals 12 having metal end caps, the MEC seals illustrated in FIGS. 5-13 may instead be any other type of grooved seal 12 having grooves on inner and/or outer faces of the grooved seal 12. FIG. 5 is a partial cross-section of an exemplary embodiment of a MEC seal 12 with an inner groove 38 on its inner face 30. The MEC seal 12 includes a curved protrusion 60 from the outer face 32 of the body 28 of the MEC seal 12. The protrusion 60 may be the portion of the body 28 of the MEC seal 12 which contacts the outer body 16.

In addition, the inner face 30 of the body 28 of the MEC seal 12 includes tapered notches 62 extending from the inner face 30 to the metal end caps 34, 36. The tapered notches 62 may reduce the contact area between the body 28 of the MEC seal 12 and the inner body 14, with which the inner face 30 of the body 28 of the MEC seal 12 contact. Additionally, the inner face 30 of the body 28 of the MEC seal 12 includes an inner groove 38 which, as discussed in greater detail above, may help create higher contacts stresses along the inner face 30 as well as enable the body 28 of the MEC seal 12 to slightly deform into the cavity formed by the inner groove 38. As such, the effectiveness of the fluid sealing characteristics of the MEC seal 12 may be enhanced for a broader range of operating temperatures and pressures.

Although illustrated in FIG. 5 as a full-radius groove, the inner groove 38, and indeed all of the grooves described herein, need not be limited to a full-radius design. For instance, the grooves may be half-radius, rectangular, triangular, and so forth. In addition, in certain embodiments, the grooves may be wider, thinner, deeper, shallower, and so forth. Indeed, no particular groove cross-section is required. However, tests have shown that a full-radius groove, in many circumstances, may provide particularly good sealing performance across a broader range of temperatures. In addition, the grooves are not too wide or deep, since a general purpose of the grooves is to minimally interrupt the sealing surface while still utilizing the radial "spring" energy of the seal. In contrast, if the grooves are too wide or too deep, the amount of radial energy stored in the seal may decrease, thereby decreasing the effectiveness of the seal. As such, the grooves may generally be designed such that the width and depth of the grooves are only a fraction (e.g., 2%, 5%, 8%, 10%, and so forth) of the sealing surface within which the grooves are located. In addition, tests have shown that another design factor may be the use of 90° angles between the inner face 30 and the inner wall of the inner groove 38 (i.e., the inner wall of the inner groove 38 and the inner face 30 are perpendicular). Furthermore, in certain conditions, tests have shown that the grooves may be most effective with radii of 0.020-inch. However, other radii values, such as 0.005-inch increments between 0.015-inch and 0.060-inch, may also be used depending on the conditions. All of these considerations also hold true for grooves on the outer face 32, as well as for all of the grooves described herein.

FIG. 6 is a partial cross-section of an exemplary embodiment of a MEC seal 12 with multiple inner grooves 38 on its inner face 30 and an outer groove 40 on its outer face 32. Instead of the curved protrusion 60 illustrated in FIG. 5, the MEC seal 12 of FIG. 6 includes multiple tapered notches 64 and associated lips 66 on the outer face 32 of the body 28 of the MEC seal 12. In addition, the outer face 32 of the body 28 of the MEC seal 12 includes the outer groove 40. The outer groove 40 may function similarly to the inner groove 38 of FIG. 5, creating higher contact stresses along the outer face 32 and allowing for the body 28 of the MEC seal 12 to slightly deform into the cavity formed by the outer groove 40. Additionally, as opposed to the embodiment illustrated in FIG. 5, the inner face 30 of the body 28 of the MEC seal 12 of FIG. 6 includes multiple inner grooves 38. The use of multiple grooves 38 along the inner face 30 may be due to a larger contact area between the inner face 30 and the inner body 14. In other words, the multiple inner grooves 38 may generate multiple points of increased contact stress, as illustrated by point 58 in FIG. 4B.

FIG. 7 is a partial cross-section of an exemplary embodiment of a MEC seal 12 with multiple inner grooves 38 on its inner face 30 and multiple outer grooves 40 on its outer face 32. For the most part, the embodiment illustrated in FIG. 7 is very similar to the embodiment illustrated in FIG. 6. However, in this embodiment, both the inner face 30 and the outer face 32 include multiple grooves. Indeed, any number of grooves may be used on the inner and outer faces 30, 32 of the body 28 of the MEC seal 12. In addition, the distance between multiples grooves on a particular face may vary. For instance, multiple grooves may be spaced ¼", ½", 1", 2", and so forth, apart from each other, depending on the specific configuration.

Each of the embodiments of the MEC seal 12 described above may include any combination of elastomers and cross-sections conducive to providing a fluid seal. Further, certain embodiments may include combinations of the embodied cross-sections. For example, an embodiment may include a cross-section including a profile similar to FIG. 5 on the inner face 30, and a cross-section including a profile similar to FIG. 7 on the outer face 32. In other words, the inner face 30 and the outer face 32 profiles may either be symmetrical with one another or asymmetrical with one another. In addition, the number, spacing, and configuration of grooves used on any particular face of the MEC seal 12 may be selected, for instance, based on the length of the interface between the MEC seal 12 and the bodies with which the MEC seal 12 contacts, the expected contact stresses, the expected operating conditions of the well 22, the desired pressure ratings of the MEC seal 12, the annular diameter and width of the MEC seal 12, and so forth. As described in greater detail below, using removable and flexible mold inserts during manufacturing of the MEC seals 12 facilitates the creation of multiple different types of MEC seals 12 having various number, spacing, and configuration of grooves.

FIG. 8 is a partial cross-section illustrating an exemplary embodiment of a mold assembly 68 used during manufacturing of the MEC seal 12 of FIG. 6. In particular, as illustrated, an inner annular mold ring 70 and an outer annular mold ring 72 may be used during the molding process. For example, in certain embodiments, once the inner and outer annular mold rings 70, 72 have been radially aligned with each other (e.g., with the outer annular mold ring 72 radially aligned outside of the inner annular mold ring 70), the bottom metal end cap 36 may be placed between the inner and outer annular mold rings 70, 72. As illustrated, bottom protruding portions 74, 76 of the inner and outer annular mold rings 70, 72, respectively, generally align with the shape of the bottom metal end cap 36 such that elastomeric raw material remains substantially encased between the inner and outer annular mold rings 70, 72 and the top and bottom metal end caps 34, 36 during the molding process. It should be noted that the particular cross-sectional profiles of the inner and outer annular mold rings 70, 72 illustrated in FIG. 8 (as well as FIG. 11) are merely exemplary, and not intended to be limiting. More specifically, in other embodiments, the inner and outer annular mold rings 70, 72 may have different cross-sectional profiles than those illustrated in FIGS. 8 and 11.

Figure 9:
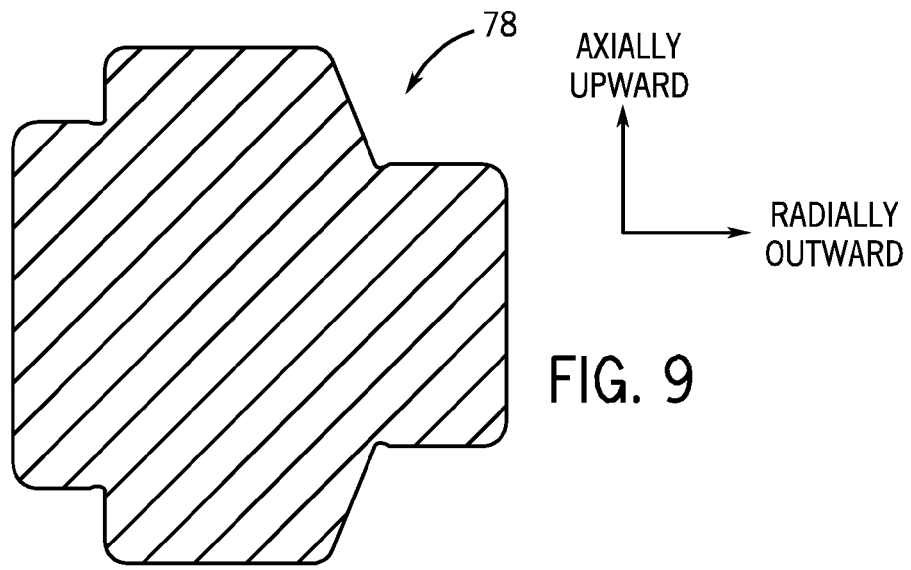
FIG. 9 is a partial cross-section of an annular elastomeric material preform used in the molding process of FIG. 8.

Once the bottom metal end cap 36 has been placed between the inner and outer annular mold rings 70, 72, a preformed annular ring of elastomeric material may be positioned between the inner and outer annular mold rings 70, 72 and on top of the bottom metal end cap 36. The elastomeric material preform 78 may have a cross-sectional profile as illustrated in FIG. 9. In general, the cross section of the elastomeric material preform 78 enables the elastomeric material preform 78 to fit between the inner and outer annular mold rings 70, 72 while facilitating compression molding of the elastomeric material preform 78. Returning now to FIG. 8, once the elastomeric material preform 78 is placed into the volume defined by the inner and outer annular mold rings 70, 72 and the bottom metal end cap 36, the top metal end cap 34 may be lowered on top of the elastomeric material preform 78, as illustrated by arrow 80. Then, additional pressure may be applied to the top metal end cap 34 by a hydraulic press to axially compress the elastomeric material preform 78. In addition, the elastomeric material preform 78 is subjected to heat sufficient to partially cure the elastomeric material preform 78.

Once the elastomeric material preform 78 has partially cured under pressure and heat to form the seal body 81, the inner and outer annular mold rings 70, 72 are removed from around the top and bottom metal end caps 34, 36 and the seal body 81. The removal of the inner and outer annular mold rings 70, 72 from around the top and bottom metal end caps 34, 36 and the seal body 81 may vary between embodiments. For example, in certain embodiments, each of the inner and outer annular mold rings 70, 72 may comprise top and bottom halves, as depicted by the dashed lines, which may be axially separated from each other, as illustrated by arrows 82, such that the seal body 81 is undisturbed by the removal of the inner and outer annular mold rings 70, 72. However, other methods of removing the inner and outer annular mold rings 70, 72 from around the top and bottom metal end caps 34, 36 and the seal body 81 may be used. Once the inner and outer annular mold rings 70, 72 have been removed, the top and bottom metal end caps 34, 36 and the seal body 81 will form the MEC seal 12 of FIG. 6 with the exception that the grooves 38, 40 and the other features of the inner and outer faces 30, 32 of the MEC seal 12 are not present. In certain embodiments, the seal body 81 is then placed in a post-cure oven, such that the elastomeric body of the seal body 81 may continue to cure until completely cured.

Figure 10:
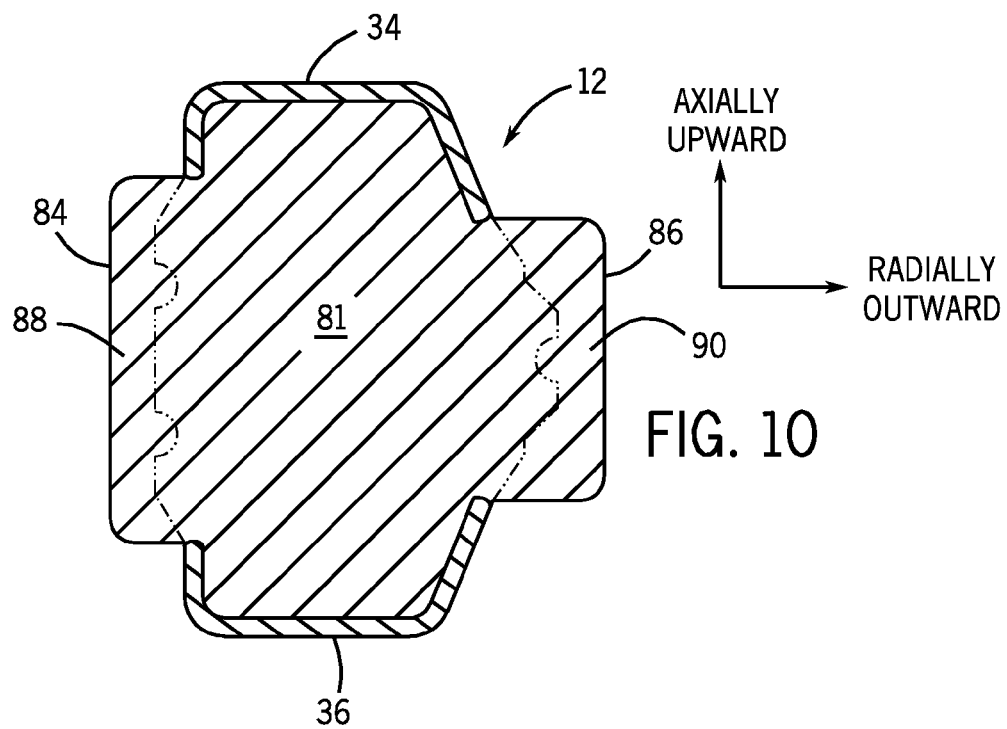
FIG. 10 is a partial cross-section of the top and bottom metal end caps and the elastomeric material preform after the molding process of FIG. 8 has been completed.

FIG. 10 is a partial cross-section of the top and bottom metal end caps 34, 36 and the seal body 81 after the molding process of FIG. 8 has been completed. As illustrated, the inner and outer faces 84, 86 of the seal body 81 include "blank" profiles, without the grooves 38, 40 and other features of the inner and outer faces 30, 32 of the MEC seal 12 of FIG. 6. In other words, the seal body 81 of the MEC seal 12 includes inner and outer annular protruding portions 88, 90 that are complementary to inner and outer annular cavities 92, 94 of the inner and outer annular mold rings 70, 72, respectively. As such, the inner and outer annular protruding portions 88, 90 are relatively featureless, having relatively orthogonal sides.

As such, secondary processes of machining the grooves 38, 40 and other features of the inner and outer faces 30, 32 of the MEC seal 12 into the seal body 81 must be performed. The dashed lines illustrated in FIG. 10 illustrate which portions in the seal body 81 must be removed to produce the final geometry of the MEC seal 12 of FIG. 6. Unfortunately, the secondary machining processes may be performed by machine shops external to the location where the molding process was performed. Therefore, additional manufacturing costs and time will be incurred using this two-step manufacturing process. Furthermore, the machining processes may introduce certain imperfections in the inner and outer faces 30, 32 of the MEC seal 12.

Figure 11:
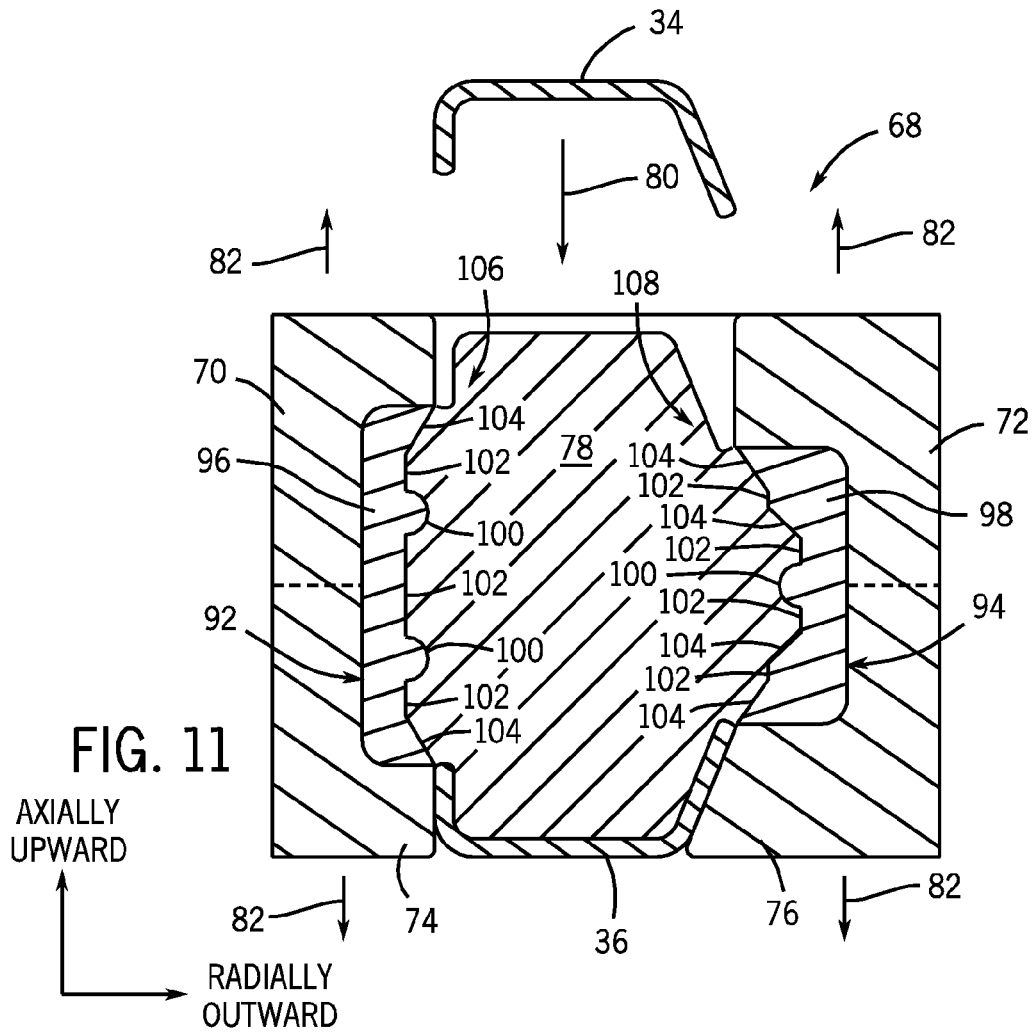
FIG. 11 is a partial cross-section illustrating an exemplary embodiment of a mold assembly used during manufacturing of the MEC seal of FIG. 6, wherein removable non-metallic mold inserts facilitate the production of the final geometry of the MEC seal during the molding process.

Therefore, a streamlined manufacturing process may be implemented, wherein removable non-metallic mold inserts are used to facilitate production of the final geometry of the MEC seal 12 during the molding process, thereby eliminating the need for the secondary machining processes. FIG. 11 is a partial cross-section illustrating an exemplary embodiment of a mold assembly 68 used during manufacturing of the MEC seal 12 of FIG. 6, wherein removable non-metallic mold inserts (or sleeves) 96, 98 facilitate the production of the final geometry of the MEC seal 12 during the molding process. The molding process described above with respect to the mold assembly 68 of FIG. 8 is substantially similar to the molding process used with respect to the mold assembly 68 of FIG. 11. However, in this embodiment, instead of introducing the elastomeric material preform 78 by itself into the volume defined by the inner and outer annular mold rings 70, 72 and the bottom metal end cap 36, the inner and outer annular mold inserts 96, 98 and the elastomeric material preform 78 are inserted into the mold assembly 68 as a preform/insert "sandwich" to facilitate the creation of the grooves 38, 40 and other features of the inner and outer faces 30, 32 of the MEC seal 12.

Figure 12:
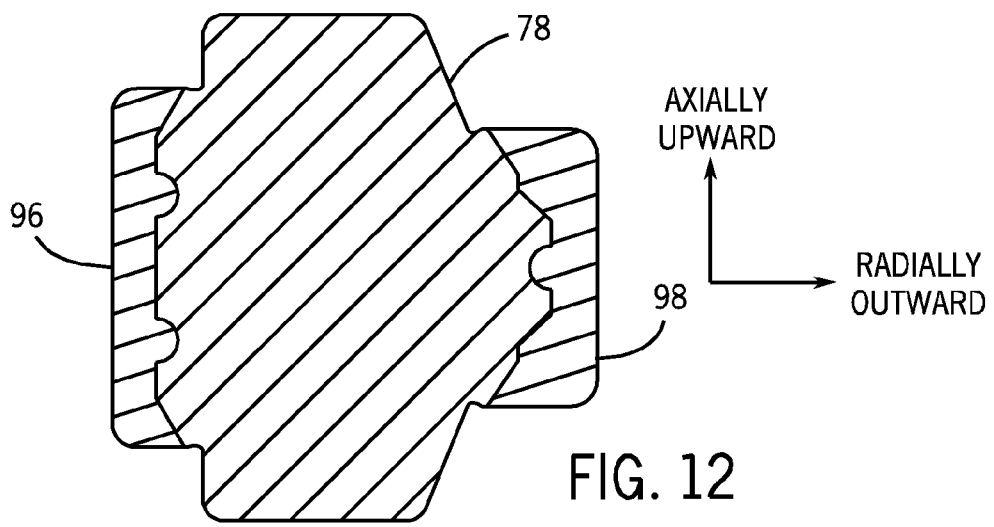
FIG. 12 is a partial cross-section of an annular elastomeric material preform and inner and outer annular mold inserts used in the molding process of FIG. 11.

More specifically, the inner and outer annular mold inserts 96, 98 are positioned on radially inner and outer sides of the elastomeric material preform 78, as illustrated in FIG. 12, before being inserted into the volume between the inner and outer annular cavities 92, 94 of the inner and outer annular mold rings 70, 72 of FIG. 11. It will be understood that, in certain embodiments, only the inner annular mold insert 96 may be used, or only the outer annular mold insert 98 may be used. In addition, while described herein as including annular mold inserts 96, 98 that, when positioned within the inner and outer annular cavities 92, 94 of the inner and outer annular mold rings 70, 72, respectively, extend all the way circumferentially around the inner and outer annular mold rings 70, 72, respectively, in other embodiments, the mold inserts 96, 98 may include discontinuous bodies that only extend circumferentially around a portion of the inner and outer annular mold rings 70, 72, respectively.

In certain embodiments, the inner and outer mold inserts 96, 98 are formed as annular mold inserts when in an undeformed state, However, the inner and outer annular mold inserts 96, 98 are comprised of relatively flexible materials that may be stretched and/or contorted into deformed states, such that the inner and outer annular mold inserts 96, 98 may be easily assembled together as a preform/insert "sandwich" (e.g., such as illustrated in FIG. 12) with the elastomeric preform material 78, and may be easily inserted between the inner and outer annular mold rings 70, 72. Generally speaking, the inner annular mold insert 96 abuts the inner annular mold ring 70 when inserted into the inner annular cavity 92, and the outer annular mold insert 98 abuts the outer annular mold ring 72 when inserted into the outer annular cavity 94.

The materials used for the inner and outer annular mold inserts 96, 98 may vary between embodiments. One characteristic of the materials used for the inner and outer annular mold inserts 96, 98 is that the inner and outer annular mold inserts 96, 98 should not easily bond with or stick to the inner and outer annular mold rings 70, 72 or the elastomeric material preform 78 that is used to form the MEC seal 12. In addition, the inner and outer annular mold inserts 96, 98 may be relatively easy to machine and inexpensive to produce. Exemplary materials include polytetrafluoroethylene (PTFE), glass-filled PTFE, synthetic polymers such as polyamides, polyetheretherketone (PEEK), nylon, and so forth.

As illustrated in FIG. 11, the inner and outer annular mold inserts 96, 98 may include protrusions 100, orthogonal surfaces 102 (e.g., surfaces that are generally parallel to the central longitudinal axis 42 of the mold assembly 68, inner and outer annular mold rings 70, 72, and inner and outer annular mold inserts 96, 98), and angled surfaces 104 that form respective non-flat inner and outer surface profiles 106, 108 of the inner and outer annular mold inserts 96, 98. The inner and outer surface profiles 106, 108 are generally complementary to the grooves 38, 40 and other features of the inner and outer faces 30, 32 of the MEC seal 12 that is created using the mold assembly 68. For example, the protrusions 100 of the inner and outer surface profiles 106, 108 of the inner and outer annular mold inserts 96, 98 are generally complementary to the grooves 38, 40 of the inner and outer faces 30, 32 of the resulting MEC seal 12. Once the inner and outer annular mold rings 70, 72 and the inner and outer annular mold inserts 96, 98 have been removed, the top and bottom metal end caps 34, 36 and the elastomeric material preform 78, which now forms the seal body 81, will form the MEC seal 12 of FIG. 6. In certain embodiments, the seal body 81 is then placed in a post-cure oven, such that the elastomeric body of the seal body 81 may continue to cure until completely cured.

Figure 13:
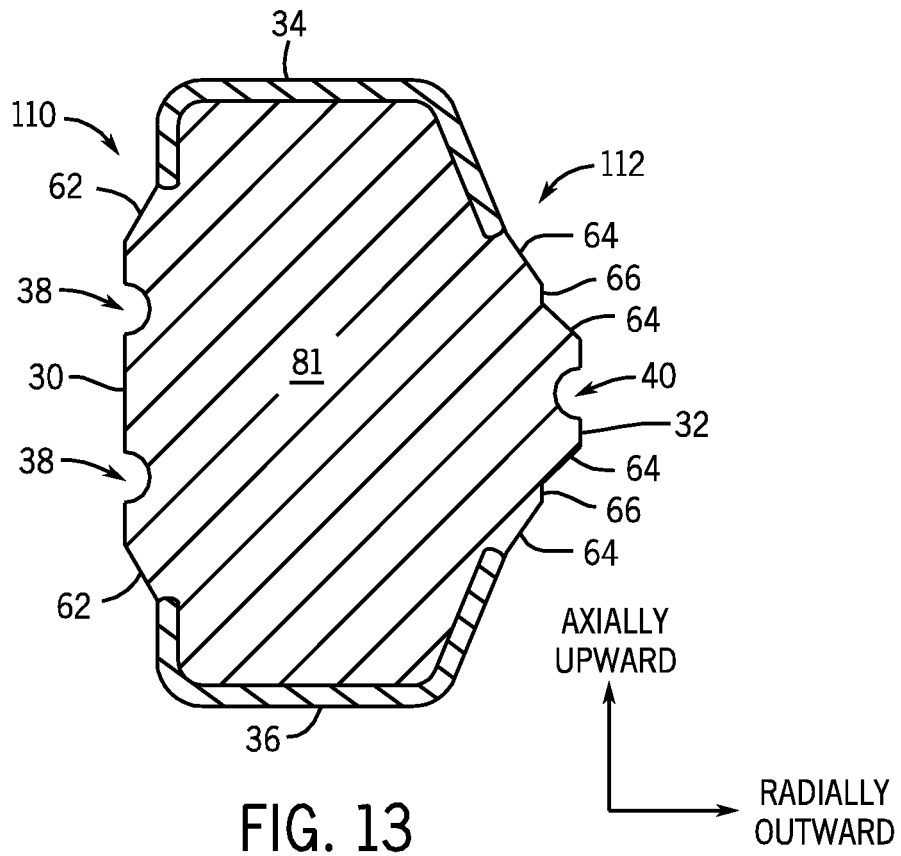
FIG. 13 is a partial cross-section of the top and bottom metal end caps and the elastomeric material preform after the molding process of FIG. 11 has been completed.

FIG. 13 is a partial cross-section of the top and bottom metal end caps 34, 36 and the seal body 81 after the molding process of FIG. 11 has been completed. As illustrated, as opposed to the embodiment illustrated in FIG. 10, the inner and outer faces 110, 112 of the seal body 81 include the grooves 38, 40 and other features of the inner and outer faces 30, 32 of the MEC seal 12 of FIG. 6. As such, no secondary processes of machining the grooves 38, 40 and other features of the inner and outer faces 30, 32 of the MEC seal 12 into the seal body 81 are required when the inner and outer annular mold inserts 96, 98 are used as part of the mold assembly 68. Therefore, no additional manufacturing costs or time will be incurred using this one-step manufacturing process. Furthermore, the inner and outer faces 30, 32 of the resulting MEC seal 12 may have fewer imperfections compared to an MEC seal 12 created using the molding process of FIG. 8.

Figure 14:
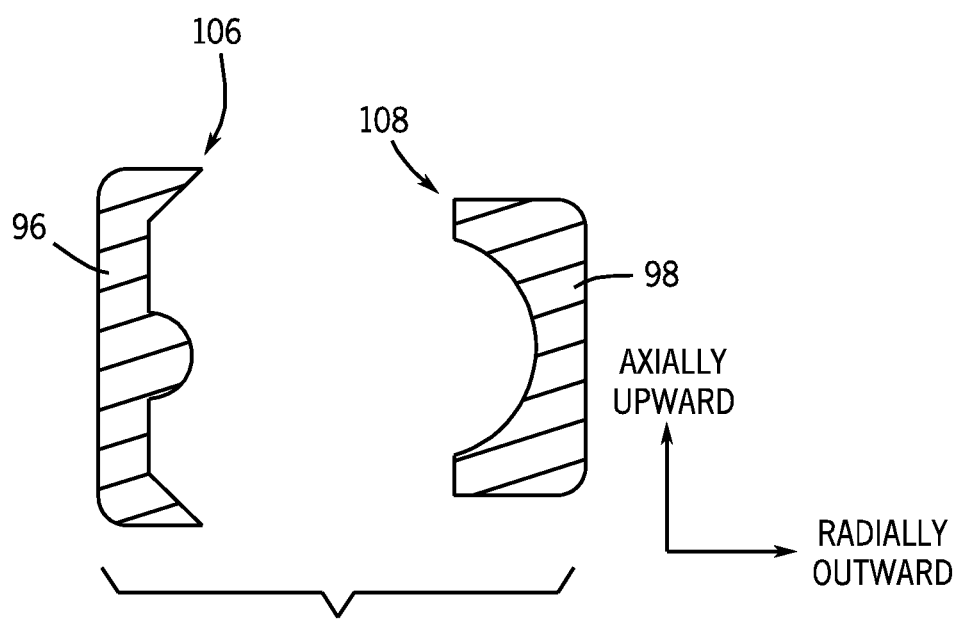
FIG. 14 is a partial cross-section of exemplary embodiments of inner and outer annular mold inserts that may be used to create the MEC seal illustrated in FIG. 5.
Figure 15:
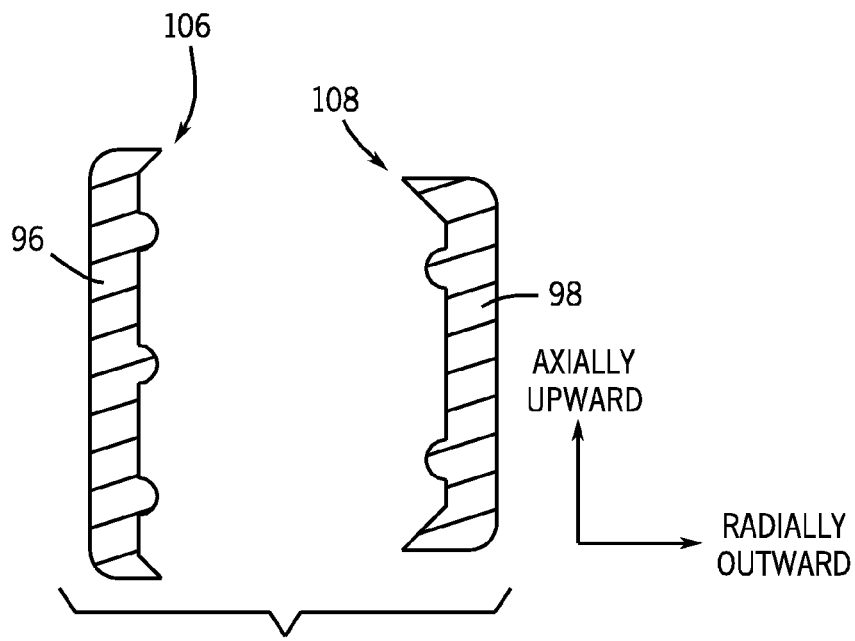
FIG. 15 is a partial cross-section of exemplary embodiments of inner and outer annular mold inserts that may be used to create the MEC seal illustrated in FIG. 7.

The MEC seals 12 illustrated in FIGS. 5 and 7 may also be manufactured using inner and outer annular mold inserts 96, 98. For example, FIG. 14 is a partial cross-section of exemplary embodiments of the inner and outer annular mold inserts 96, 98 that may be used to create the MEC seal 12 illustrated in FIG. 5, and FIG. 15 is a partial cross-section of exemplary embodiments of the inner and outer annular mold inserts 96, 98 that may be used to create the MEC seal 12 illustrated in FIG. 7. As illustrated, the respective inner and outer surface profiles 106, 108 of the inner and outer annular mold inserts 96, 98 are designed such that complementary grooves 38, 40 and other features of the inner and outer faces 30, 32 of the MEC seals 12 are created without the need to perform secondary machining operations on the MEC seals 12.

As will be appreciated, the inner and outer surface profiles 106, 108 of the inner and outer annular mold inserts 96, 98 may be designed with any number and combinations of protrusions 100, orthogonal surfaces 102, and angled surfaces 104 to create desired complementary grooves 38, 40 and other features of the inner and outer faces 30, 32 of the MEC seals 12. Furthermore, in certain embodiments, only an inner annular mold insert 96 may be used, or only an outer annular mold insert 98 may be used, with the other radial side of the resulting MEC seal 12 having a "blank" profile. In addition, the inner and outer annular mold inserts 96, 98 are reusable, and may be used to produce many different MEC seals 12 without the need to replace the inner and outer annular mold rings 70, 72. Indeed, only one set of inner and outer annular mold rings 70, 72 may be used to create many different types of MEC seals 12. For example, the inner and outer annular mold inserts 96, 98 may be used in an interchangeable manner, facilitating the use of multiple different inner annular mold inserts 96 with multiple different outer annular mold inserts 98.

In addition, because the inner and outer annular mold inserts 96, 98 are comprised of materials that are relatively flexible, resilient, and low-friction, the inner and outer annular mold inserts 96, 98 may be easily removable from the mold assembly 68 once the elastomeric material preform 78 partially cures to form the seal body 81 of the MEC seal 12. For example, the inner and outer annular mold inserts 96, 98 may be removed by sliding, stretching, or contorting the inner and outer annular mold inserts 96, 98 around the partially cured elastomeric material preform 78 (i.e., seal body 81) such that the partially cured elastomeric material preform 78 is not disturbed. As such, the inner and outer annular mold inserts 96, 98 do not need to be destroyed before removing the grooved seal 12 from the mold assembly 68. Rather, the inner and outer annular mold inserts 96, 98 are easily removable and reusable.

Figure 16:
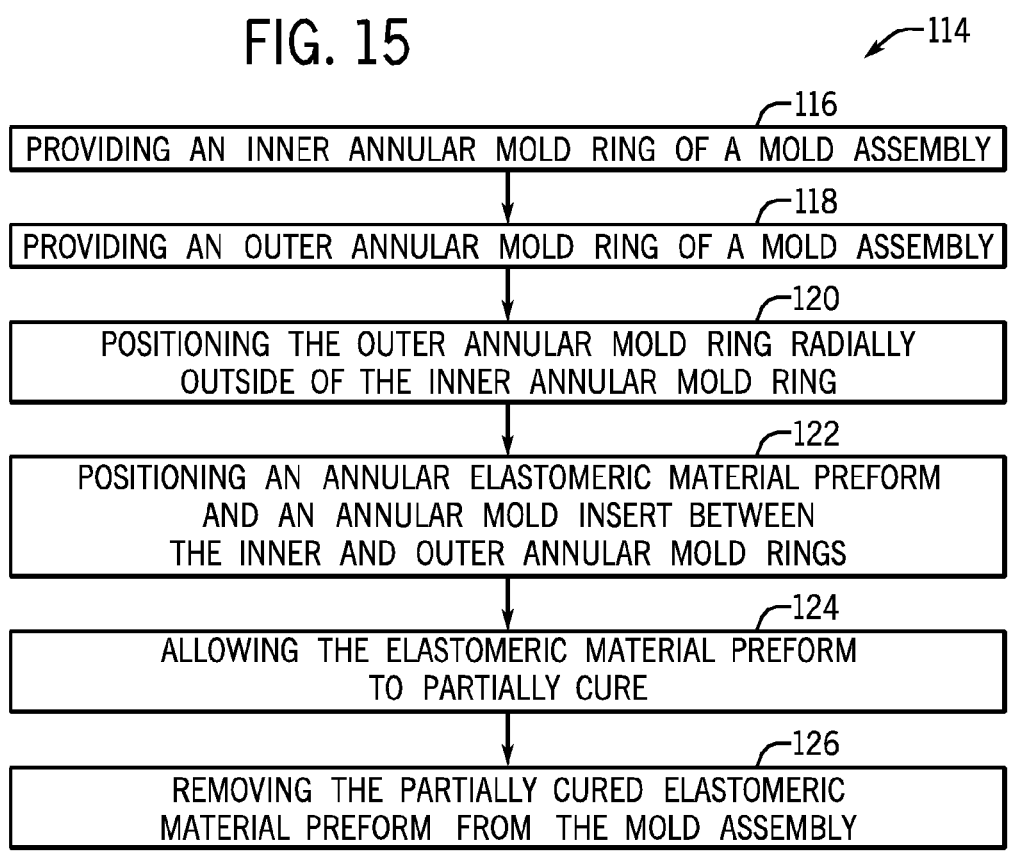
FIG. 16 is a process flow diagram of an exemplary method of manufacturing of the grooved seal.

FIG. 16 is a process flow diagram of an exemplary method 114 of manufacturing of the grooved seal 12. In step 116, the inner annular mold ring 70 of the mold assembly 68 may be provided. Similarly, in step 118, the outer annular mold ring 72 of the mold assembly 68 may be provided. Then, in step 120, the outer annular mold ring 72 of the mold assembly 68 may be positioned radially outside of the inner annular mold ring 70 of the mold assembly 68. Generally speaking, as illustrated in FIGS. 8 and 11, the inner and outer annular mold rings 70, 72 will be axially aligned. In addition, in certain embodiments where the grooved seal 12 is an MEC seal, the bottom metal end cap 36 may be positioned between the inner and outer annular mold rings 70, 72 at a bottom axial end of the inner and outer annular mold rings 70, 72 before the elastomeric material preform 78 is introduced into the volume defined between the inner and outer annular mold rings 70, 72.

In step 122, the annular elastomeric material preform 78 and an annular mold sleeve (e.g., the inner annular mold insert 96 or the outer annular mold insert 98) may be positioned between the inner and outer annular mold rings 70, 72. For example, as described above, the elastomeric material preform 78 and the inner and/or outer annular mold insert 96, 98 may be placed between the inner and outer annular mold rings 70, 72 as a preform/insert "sandwich." Furthermore, in certain embodiments, the top and bottom metal end caps 34, 36 may be placed around the preform/insert "sandwich." As described above, in certain embodiments, the annular mold sleeve may be made of a non-metallic material, such as PTFE, glass-filled PTFE, synthetic polymers such as polyamides, PEEK, nylon, and so forth. As such, the annular mold sleeve may be relatively flexible and capable of being stretched or contorted to facilitate positioning the annular mold sleeve inside and/or around the elastomeric material preform 78 to form a preform/insert "sandwich," as well as facilitating removal of the annular mold sleeve from around the elastomeric material preform 78 once it has partially cured.

As also described above, in certain embodiments, an inner annular mold sleeve (e.g., the inner annular mold insert 96) includes a radially outward facing profile (e.g., the inner surface profile 106 of the inner annular mold insert 96) having at least one annular protrusion 100 that faces the volume defined between the inner and outer annular mold rings 70, 72 when the inner annular mold sleeve is positioned in an inner annular cavity (e.g., the inner annular cavity 92 of the inner annular mold ring 70). In addition, in certain embodiments, an outer annular mold sleeve (e.g., the outer annular mold insert 98) includes a radially inward facing profile (e.g., the outer surface profile 108 of the outer annular mold insert 98) having at least one annular protrusion 100 that faces the volume defined between the inner and outer annular mold rings 70, 72 when the outer annular mold sleeve is positioned in an outer annular cavity (e.g., the outer annular cavity 94 of the outer annular mold ring 72).

In step 124, once the elastomeric material preform 78 and the inner and/or outer annular mold inserts 96, 98 have been introduced into the volume defined between the inner and outer annular mold rings 70, 72, the elastomeric material preform 78 may be allowed to partially cure due to compression and heat. As described above, in certain embodiments where the grooved seal 12 is an MEC seal, the top metal end cap 34 may be positioned between the inner and outer annular mold rings 70, 72 at a top axial end of the inner and outer annular mold rings 70, 72 before allowing the elastomeric material preform 78 to partially cure. In step 126, once the elastomeric material preform 78 has been allowed to partially cure, the partially cured elastomeric material preform 78 may be removed from the mold assembly 68, and the partially cured elastomeric material preform 78 forms the seal body 81 of the grooved seal 12.

In certain embodiments, removing the partially cured elastomeric material preform 78 from the mold assembly 68 may include sliding, stretching, or contorting the flexible annular mold sleeve(s) such that the partially cured elastomeric material preform 78 is not disturbed. Otherwise, the annular mold sleeve(s) would be destroyed, eliminating the possibility of re-using the annular mold sleeve(s) between grooved seals 12, which is one of the advantages of the presently disclosed techniques. In addition, in certain embodiments, removing the partially cured elastomeric material preform 78 from the mold assembly 68 may include splitting each of the inner and outer mold rings 70, 72 into top and bottom axial halves, thereby facilitating removal of the hardened elastomeric material preform 78 from the mold assembly 68. In addition, as described above, in certain embodiments, the seal body 81 may then be placed in a post-cure oven, such that the elastomeric body of the seal body 81 may continue to cure until completely cured.

It should be noted that while the embodiments presented herein generally include annular grooved seals 12 having grooves that extend circumferentially around inner and outer annular faces of the grooved seal 12, in other embodiments, different types of grooved seals 12 may be used. For example, in certain embodiments, the molding techniques described herein may be extended to annular grooved seals 12 having grooves on upper and lower axial sides of the grooved seal 12 (e.g., which seal against bodies that are positioned above and below the grooved seal 12 along the longitudinal axis 42). In such an embodiment, the mold rings may include upper and lower mold rings, and the mold inserts described herein may be inserted into cavities of the upper and lower mold rings.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method, comprising:
providing an inner annular mold ring of a seal mold assembly;
providing an outer annular mold ring of the seal mold assembly;
positioning the outer annular mold ring radially outside of the inner annular mold ring;
positioning an elastomeric material preform, at least one metal end cap, and a mold sleeve between the inner and outer annular mold rings, wherein the mold sleeve comprises a radially inward or radially outward facing profile having a protrusion that faces a volume defined between the inner and outer annular mold rings, wherein the at least one metal end cap is disposed at a bottom axial end or a top axial end of the inner and outer annular mold rings, wherein the mold sleeve is disposed in a substantially stationary position, or the mold sleeve is flexible, or a combination thereof;
subsequently allowing the elastomeric material preform to partially cure; and
removing the partially cured elastomeric material preform from the seal mold assembly.

2. The method of claim 1, wherein positioning the mold sleeve comprises positioning a flexible, non-metallic mold sleeve between the inner and outer annular mold rings.

3. The method of claim 1, wherein positioning the mold sleeve comprises positioning the mold sleeve comprising polytetrafluoroethylene between the inner and outer annular mold rings.

4. The method of claim 1, wherein positioning the mold sleeve comprises positioning the mold sleeve comprising glass-filled polytetrafluoroethylene between the inner and outer annular mold rings.

5. The method of claim 1, wherein positioning the mold sleeve comprises positioning the mold sleeve comprising a synthetic polymer between the inner and outer annular mold rings.

6. The method of claim 1, wherein positioning the mold sleeve comprises positioning the mold sleeve comprising polyetheretherketone between the inner and outer annular mold rings.

7. The method of claim 1, wherein positioning the mold sleeve comprises positioning an inner mold sleeve between the inner and outer annular mold rings in an inner annular cavity of the inner annular mold ring configured to receive the inner mold sleeve, and positioning an outer mold sleeve between the inner and outer annular mold rings in an outer annular cavity of the outer annular mold ring configured to receive the outer mold sleeve.

8. The method of claim 7, wherein the inner mold sleeve comprises a radially outward facing profile having a first protrusion that faces the volume defined between the inner and outer annular mold rings when the inner mold sleeve is positioned in the inner annular cavity of the inner annular mold ring, and the outer mold sleeve comprises a radially inward facing profile having a second protrusion that faces the volume defined between the inner and outer annular mold rings when the outer mold sleeve is positioned in the outer annular cavity of the outer annular mold ring.

9. The method of claim 1, wherein the at least one metal end cap comprises top and bottom metal end caps, and comprising positioning the bottom metal end cap between the inner and outer annular mold rings at the bottom axial end of the inner and outer annular mold rings before positioning the elastomeric material preform and the mold sleeve into the volume defined between the inner and outer annular mold rings, and positioning the top metal end cap between the inner and outer annular mold rings at the top axial end of the inner and outer annular mold rings before allowing the elastomeric material preform to partially cure.

10. The method of claim 1, wherein removing the partially cured elastomeric material from the seal mold assembly comprises sliding, stretching, or contorting a flexible material of the mold sleeve such that the partially cured elastomeric material preform is not disturbed.

11. The method of claim 1, wherein removing the partially cured elastomeric material from the seal mold assembly comprises splitting each of the inner and outer annular mold rings into top and bottom axial halves.

12. The method of claim 1, wherein the mold sleeve is disposed in the substantially stationary position between the inner and outer annular mold rings.

13. The method of claim 1, comprising:
applying pressure to force the elastomeric material preform against the mold sleeve between the inner and outer annular mold rings to mold the elastomeric material preform into a seal with a seal interface profile having the radially inward or radially outward facing profile with the protrusion;
wherein removing the partially cured elastomeric material preform from the seal mold assembly comprises separating the seal from at least one of the inner annular mold ring, the outer annular mold ring, or the mold sleeve at least partially by resiliently deforming the mold sleeve.

14. A method, comprising:
providing an inner annular mold ring of a seal mold assembly;
providing an outer annular mold ring of the seal mold assembly;
positioning the outer annular mold ring radially outside of the inner annular mold ring;
positioning an inner mold sleeve between the inner and outer annular mold rings in an inner annular cavity of the inner annular mold ring configured to receive the inner mold sleeve, wherein the inner mold sleeve comprises a radially outward facing profile having a first protrusion that extends into a volume defined between the inner and outer annular mold rings when the inner mold sleeve is positioned in the inner annular cavity of the inner annular mold ring, and wherein the inner mold sleeve is disposed in a first substantially stationary position, or the inner mold sleeve is flexible, or a combination thereof;
positioning an outer mold sleeve between the inner and outer annular mold rings in an outer annular cavity of the outer annular mold ring configured to receive the outer mold sleeve, wherein the outer mold sleeve comprises a radially inward facing profile having a second protrusion that extends into the volume defined between the inner and outer annular mold rings when the outer mold sleeve is positioned in the outer annular cavity of the outer annular mold ring, and wherein the outer mold sleeve is disposed in a second substantially stationary position, or the outer mold sleeve is flexible, or a combination thereof;
positioning an elastomeric material preform in the volume defined between the inner and outer annular mold rings;
positioning at least one metal end cap between the inner and outer annular mold rings at a bottom axial end or a top axial end of the inner and outer annular mold rings;
subsequently allowing the elastomeric material preform to partially cure; and
removing the partially cured elastomeric material preform from the seal mold assembly.

15. The method of claim 14, wherein the at least one metal end cap comprises top and bottom metal end caps, and comprising positioning the bottom metal end cap between the inner and outer annular mold rings at the bottom axial end of the inner and outer annular mold rings before positioning the elastomeric material in the volume defined between the inner and outer annular mold rings, and positioning the top metal end cap between the inner and outer annular mold rings at the top axial end of the inner and outer annular mold rings before allowing the elastomeric material to partially cure.

16. The method of claim 14, wherein removing the partially cured elastomeric material from the seal mold assembly comprises sliding, stretching, or contorting flexible material of the inner and outer mold sleeves such that the partially cured elastomeric material preform is not disturbed.

17. The method of claim 14, wherein the inner and outer mold sleeves are made of flexible material comprising at least one of polytetrafluoroethylene, glass-filled polytetrafluoroethylene, a synthetic polymer, nylon, or polyetheretherketone.

18. The method of claim 14, wherein the inner mold sleeve is disposed in the first substantially stationary position, and the outer mold sleeve is disposed in the second substantially stationary position.

19. A method, comprising:
positioning an elastomeric preform, at least one metal end cap, and a flexible mold insert in a substantially stationary position between first and second mold structures, wherein the at least one metal end cap is disposed at a first end or a second end of the first and second mold structures, wherein the flexible mold insert has a seal interface profile;

subsequently applying pressure to force the elastomeric preform against the flexible mold insert between the first and second mold structures to mold the elastomeric preform into a seal with the seal interface profile;

subsequently allowing the elastomeric preform to at least partially cure; and separating the seal from at least one of the first mold structure, the second mold structure, or the flexible mold insert at least partially by resiliently deforming the flexible mold insert.

* * * * *